March 3, 1931. R. B. WARD 1,794,812
BATTERY CLAMP TERMINAL
Filed Dec. 26, 1928 3 Sheets-Sheet 1

INVENTOR
Ralph B. Ward
BY
Clive Hartson
HIS ATTORNEY

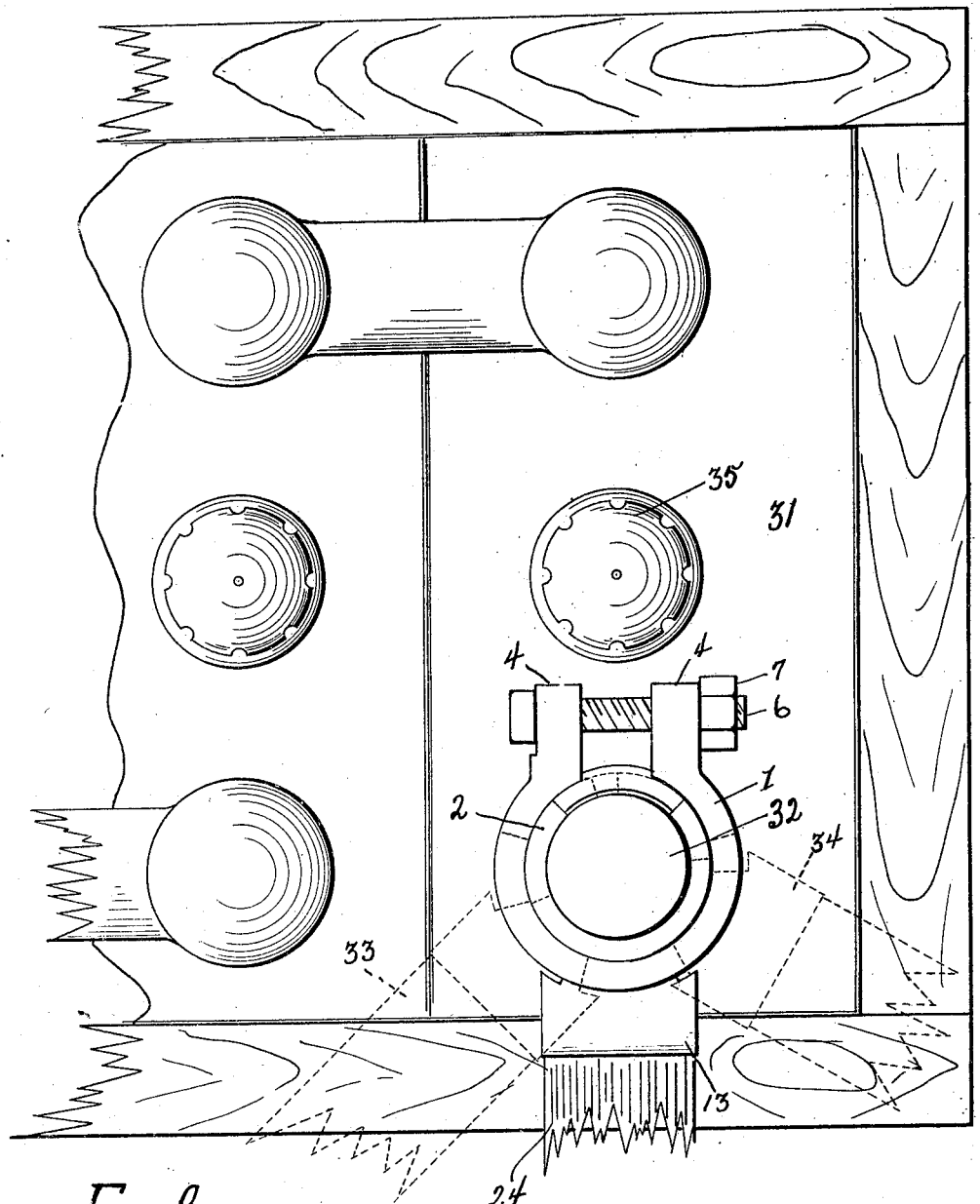

Patented Mar. 3, 1931

1,794,812

UNITED STATES PATENT OFFICE

RALPH B. WARD, OF LOS ANGELES, CALIFORNIA

BATTERY-CLAMP TERMINAL

Application filed December 26, 1928. Serial No. 328,470.

This invention relates to battery clamp terminals, especially to that type of battery clamp terminals used in connection with storage batteries of automotive vehicles. This invention is particularly adapted for connection upon the grounded side of the ignition and lighting circuits of such vehicles, in that it lends itself to ready connection between the vehicle frame and the negative post of such battery.

The object of this invention is to provide a battery clamp terminal which has embodied therein an electric circuit lead or connection which is adjustable relative to an instrumentality provided for securing it to a battery post. In its embodiment it consists of a contact member to engage a battery post and a clamp to hold the contact member in engagement with such post. The clamp is provided with means for creating a frictional contact between the contact member and the battery post, and may be positioned upon the battery post in a position most convenient for its safe adjustment regardless of the position of the contact member within certain well defined limits.

To this end this invention consists in certain novel features which will now be described, and later particularly pointed out in the claims.

In the accompanying drawings:—

Fig. 9 illustrates the invention in use upon a storage battery.

Similar numerals refer to similar parts throughout the several views.

Figure 1:
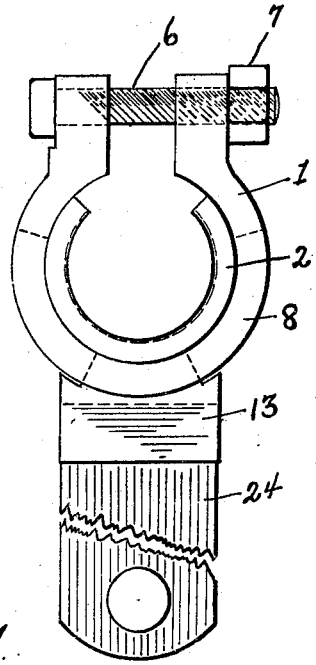
Figure 1 is a top plan view of the invention.

The invention in its entirety may be considered as embodying two major members, a clamp 1 and a contact member 2. The member 1 is the clamping member for securing the contact member 2 to the positive or negative post of a storage or other type of battery. The clamp 1 is a split ring, having a curved or annular intermediate body portion 3 and parallelly disposed end portions 4. The ends 4 are provided each with a hole 5 for the insertion of a bolt 6, which bolt is provided with a nut 7 threaded thereto.

Figure 3:
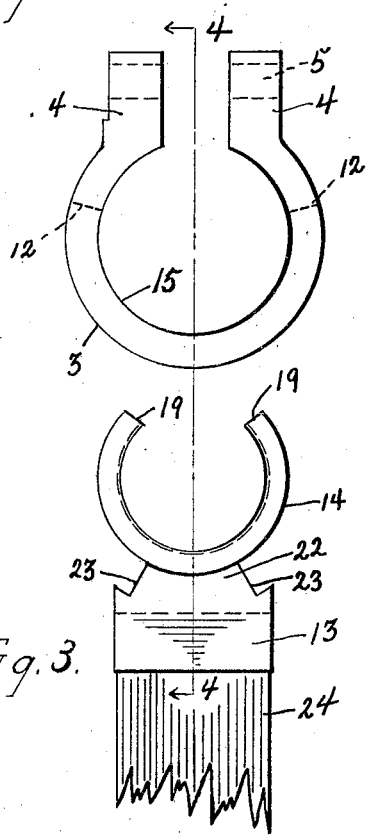
Fig. 3 is a top plan view showing in detail the two major members constituting the invention.
Figure 4:
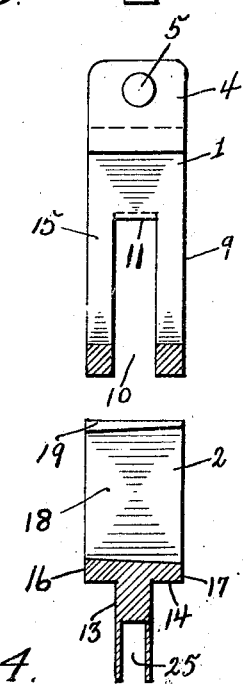
Fig. 4 is a cross section taken on section line 4—4 of Figure 3.

Extending through the curved portion of the clamp 1, intermediate the top 8 and the bottom 9 thereof, and spaced from the ends 4, there is provided an elongated opening or slot 10, the ends of which, 11, are indicated by the dotted lines 12 in Figures 1 and 3. The purpose of this slot will be hereafter described.

Figure 2:
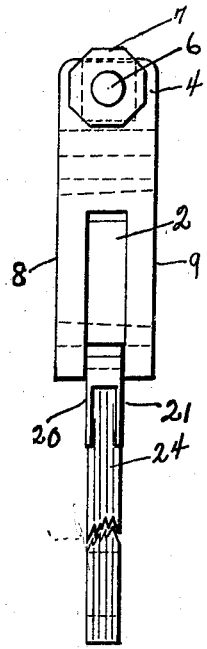
Fig. 2 is a side elevation of Fig. 1.

The contact member 2, comprises an annular or split ring member having a shank 13 formed integrally therewith. The member 2 is clasped by the clamp 1 so that the outer wall 14 of the contact member abuts the inner wall 15 of the clamp, the shank 13 being so formed that it extends through the slot 10 as is shown in Figure 2. The top 16 of the member 2 may be constructed somewhat broader than the bottom 17 in order to provide a tapered inner wall 18. The tapering of the inner wall is necessary to provide contact with the usual type of tapered battery posts.

The shank 13 projects from the contact member 2 at a region intermediate the spaced ends 19 thereof, and is spaced between the top 16 and the bottom 17. The shank is provided with upper and lower parallel surfaces, 20 and 21 respectively, which permit it to move freely within the slot 10. The shank narrows somewhat where it approaches the member 2, forming a neck 22 with recessed edges 23. The recessed edges 23 engage the ends 11 of the slot 10 and constitute stops for a too extended movement of the shank in the slot. Electric circuit connections are made with the shank 13, one type here shown being a conducting or connecting strap 24.

To receive such a strap the shank is provided with a recess 25 in the outer end thereof. The type of strap illustrated is used quite extensively in automotive construction wherein the negative post of a storage battery is grounded in the frame of a machine.

Figure 5:
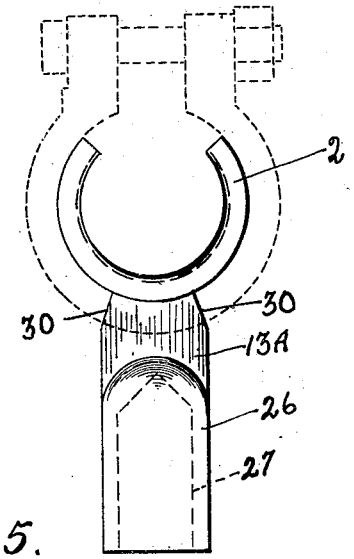
Fig. 5 is a modified form of the invention, showing the contact member in detail and the clamp in outline.
Figure 6:
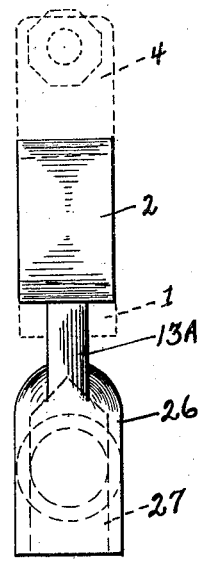
Fig. 6 is a side elevation of Fig. 5.

However other types of connections may be used with this device. Figures 5 and 6 show a shank 13A provided with a coaxial cylindrical enlargement 26 provided with an interior space, as is indicated by the dotted outlines 27, for the insertion of the end of a conductor cable.

Figure 7:
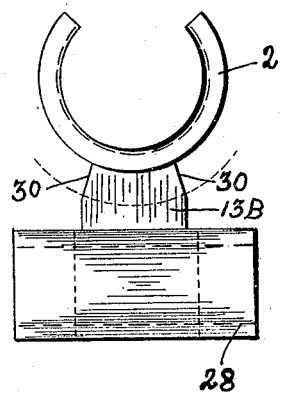
Fig. 7 is a plan view of a modified form of contact member.
Figure 8:
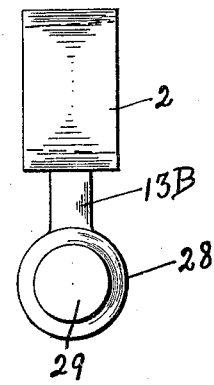
Fig. 8 is a side elevation of Fig. 7.

Yet another embodiment is shown in Figures 7 and 8, wherein the shank 13B is provided with a cylindrical member 28 extending transversely thereof. The member 28 has an interior space 29 open from end to end thereby allowing the insertion of a conductor cable in either end thereof. Both shanks, 13A and 13B are provided with diagonal shoulders 30 for a purpose substantially the same as the recessed edges 23.

The invention is used in the manner illustrated in Figure 9, wherein 31 is a fragmentary representation of a storage battery, and 32 a post thereof. This view shows the invention secured to the post 32, the contact member clasping the post, and the clamp 1 holding the member 2 in contact with the post. By drawing the ends 4 together by means of the bolt 6 and the nut 7 the circumference of both members 1 and 2 are decreased thereby causing the member 1 to shrink on member 2, and consequently member 2 to shrink on the post 32.

In Figure 9, in addition to the full line, there is shown in outlines 33 and 34, the positions in which the shank 13 and the strap 24 may be placed without moving the clamp 1 about the post 32. It will be seen that considerable movement to the right or left may be given the shank and strap without the necessity of moving the clamp 1. If the shank, strap and clamp were rigid to one another and were in the position shown in outline 34, the nut 7 of the bolt 6 would be positioned immediately above the filler cap 35, which would necessitate great care in screwing up the nut 7 with a wrench in order to avoid breaking the cap with possibly disastrous results.

Having described the invention, what is claimed is:—

1. In a battery clamp terminal, a clamp member constituting a split ring and means for drawing the ends of said ring together, a contact member clasped by said clamp member, said contact member likewise being a split ring concentric with said clamp, said clamp having an elongated slot intermediate its ends, and a shank projecting radially from said contact member and extending through the aforesaid slot.

2. A battery clamp terminal comprising a clamp member constituting a split ring and means for drawing the ends of said ring together, a contact member clasped by said clamp, the outer wall of said contact member constantly abutting the inner wall of said clamp, said contact member designed to frictionally clasp a battery post, there being an elongated slot in the intermediate body portion of said clamp, a shank projecting from said contact member extending through said slot, and said slot being of length to permit of substantial rotary movement of said contact member relative to said clamp.

RALPH B. WARD.